(12) United States Patent
Peng et al.

(10) Patent No.: US 8,928,490 B2
(45) Date of Patent: Jan. 6, 2015

(54) METER APPARATUS, METERING NETWORK, AND METERING METHOD THEREOF

(75) Inventors: Chih-Hsiang Peng, Hsinchu (TW); Wan-Neng Liu, Hsinchu (TW)

(73) Assignee: Wistron Neweb Corp., Hsinchu (TW)

( * ) Notice: Subject to any disclaimer, the term of this patent is extended or adjusted under 35 U.S.C. 154(b) by 435 days.

(21) Appl. No.: 13/432,924

(22) Filed: Mar. 28, 2012

(65) Prior Publication Data
US 2013/0181846 A1 Jul. 18, 2013

(30) Foreign Application Priority Data

Jan. 18, 2012 (TW) .............................. 101101883 A

(51) Int. Cl.
*G01D 4/00* (2006.01)
(52) U.S. Cl.
USPC ............................. 340/870.02; 702/45; 702/46
(58) Field of Classification Search
USPC .................................. 340/870.02; 702/45, 46
See application file for complete search history.

(56) References Cited

U.S. PATENT DOCUMENTS

| | | | | |
|---|---|---|---|---|
| 4,034,292 A | * | 7/1977 | McClelland, III | 324/157 |
| 4,999,572 A | * | 3/1991 | Bickford et al. | 324/103 R |
| 6,232,885 B1 | * | 5/2001 | Ridenour et al. | 340/870.02 |
| 6,617,978 B2 | * | 9/2003 | Ridenour et al. | 340/870.29 |
| 2008/0302172 A1 | * | 12/2008 | Kates | 73/40.5 R |
| 2010/0070213 A1 | | 3/2010 | Anklam | |
| 2013/0263675 A1 | * | 10/2013 | Isicovich et al. | 73/861.11 |
| 2014/0139682 A1 | * | 5/2014 | Lye et al. | 348/160 |

FOREIGN PATENT DOCUMENTS

| | | |
|---|---|---|
| CN | 101427437 | 5/2009 |
| CN | 201392353 | 1/2010 |
| TW | 330899 | 5/1998 |

OTHER PUBLICATIONS

English language translation of abstract of TW 330899 (published May 1, 1998).
English language translation of abstract of CN 101427437 (published May 6, 2009).
English language translation of abstract of CN 201392353 (published Jan. 27, 2010).

* cited by examiner

*Primary Examiner* — Andrew Bee
(74) *Attorney, Agent, or Firm* — McClure, Qualey & Rodack, LLP

(57) ABSTRACT

A meter apparatus, a metering network, and a metering method thereof are provided. The meter apparatus includes a pulse generator, an optical sensor, a spinning disc, and a magnetic sensor. The pulse generator is configured to generate a number of pulses proportional to an amount of a consumed resource. The optical sensor is configured to detect the number of pulses to generate a first signal, and transmit the first signal to a meter reader. The spinning disc is configured to produce an amount of rotation proportional to the amount of the consumed resource. The magnetic sensor is configured to detect the amount of the rotation to generate a second signal, and transmit the second signal to the meter reader.

17 Claims, 5 Drawing Sheets

METER APPARATUS, METERING NETWORK, AND METERING METHOD THEREOF

This Application claims priority of Taiwan Patent Application No. 101101883, filed on Jan. 18, 2012, and the entirety of which is incorporated by reference herein.

BACKGROUND OF THE INVENTION

1. Field of the Invention

The present invention relates to a network, and in particular relates to a meter apparatus, a metering network, and metering method thereof.

2. Description of the Related Art

A smart grid regulates a supplied resource such as water, gas, and electricity based on information about resource suppliers and consumers, thereby saving energy, reducing loss, and increasing reliability of the distribution network. Use of the smart grid began in the $20^{th}$ century, when power generating plants and stations were interconnected with local electric grids to become an electric power grid capable of being monitored and resource consumption data being collected, continuously and in real-time, thereby allowing for power supply and usage of the available power to be regulated according to an optimized power scheme over a larger power coverage scale. For example, charging a battery during an off-peak period and supplies the electricity grid with the electricity stored during a peak period.

The smart grid comprises smart meters for monitoring resource consumption and meter readers for determining the readings. Currently, the smart meter only uses an LED sensor or a reflective sensor to detect the resource consumption. A meter apparatus, a metering network and a method thereof are in need to provide reliable consumed resource detection.

BRIEF SUMMARY OF THE INVENTION

In one aspect of the invention, a meter apparatus is disclosed, comprising a pulse generator, an optical sensor, a spinning disc, and a magnetic sensor. The pulse generator is configured to generate a number of pulses proportional to an amount of a consumed resource. The optical sensor is configured to detect the number of pulses to generate a first signal, and transmit the first signal to a meter reader. The spinning disc is configured to produce an amount of rotation proportional to the amount of the consumed resource. The magnetic sensor is configured to detect the amount of the rotation to generate a second signal, and transmit the second signal to the meter reader.

In another aspect of the invention, a metering network is provided, comprising an apparatus and a meter reader. The apparatus comprises a pulse generator, an optical sensor, a spinning disc, and a magnetic sensor. The pulse generator is configured to generate a number of pulses proportional to an amount of a consumed resource. The optical sensor is configured to detect the number of pulses to generate a first signal, and transmit the first signal to a meter reader. The spinning disc is configured to produce an amount of rotation proportional to the amount of the consumed resource. The magnetic sensor is configured to detect the amount of the rotation to generate a second signal, and transmit the second signal to the meter reader. The meter reader is configured to determine a reading according to the first and second signals.

In yet another aspect of the invention, a metering method is revealed, performed by a meter apparatus, comprising: generating a number of pulses proportional to an amount of a consumed resource; detecting the number of pulses to generate a first signal, and transmit the first signal to a meter reader; producing an amount of rotation proportional to the amount of the consumed resource; and detecting the amount of the rotation to generate a second signal, and transmit the second signal to the meter reader.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The USB specifications and the USB Battery Charging specifications are used to teach the spirit of the invention, and the invention is not limited thereto.

Figure 1:
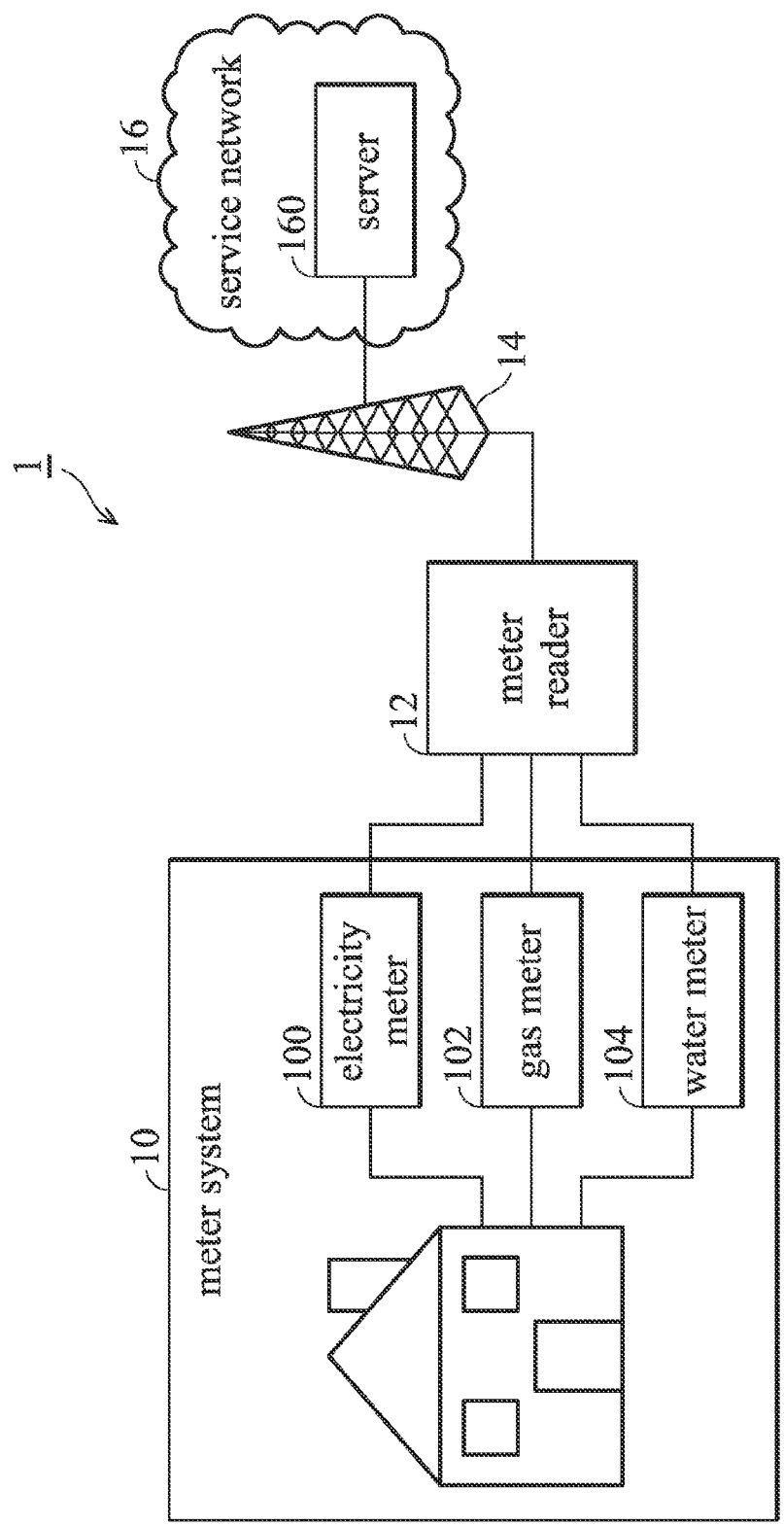
FIG. 1 is a block diagram of a smart grid 1 according to an embodiment of the invention.

FIG. 1 is a block diagram of a smart grid 1 according to an embodiment of the invention, comprising a reading system 10, a meter reader 12, a base station 14, and a service network 16. The reading system 10 is coupled to the meter reader 12, the base station 14, and then to the service network 16. The reading system 10 keeps tracks of the amount of consumed resources such as water, electricity, and gas in residential, commercial, industrial, and agricultural zones. Each household has a reading system 10 installed for continuously monitoring the amount of the consumed resource, sending the data of the amount of the consumed resource to the meter reader 12 to determine a reading accordingly, and transmitting the reading to the service network 16 though the base station 14 for data storage. The service network 16 may be a cloud network, including a server 160 configured to retain all readings from the meter reader 12. The smart grid 1 is built on the existing electricity, water and gas networks, evolving from manual monitoring, remote monitoring, and automatic monitoring, to automatic system adjustment based on the monitored data. In some embodiments, the smart grid 1 is an electricity network, employing superconducting wires to reduce electricity loss during transmissions, integrating with other power resources such as wind power, thermo power, solar power, and so on. The smart grid 1 actively regulates energy usage in a household, an office, or a factory, subsidizes energy-related services during the peak period, and allows high-power demand electronic appliances such as clothes dryers, air-conditioners, heaters, ovens, cooking tops and heat sinks to be used only during the off-peak period. The communication network in the smart grid 1 may be implemented by a Z-Wave, Zigbee, WiFi, PSTN, or electricity network, managing resource consumption for each end-user through certain communication protocols.

The reading system 10 comprises meter apparatuses such as an electricity meter 100, gas meter 102, and water meter 104, respectively monitoring electricity, gas and water consumption for each end-user. The electricity meter 100, gas meter 102, and water meter 104 each employs two different sensing devices to monitor the amount of a consumed resource. The two different sensing devices may be, for example, optical and magnetic sensing devices. The two different sensing devices can measure the amount of the consumed resource independently which can further be used for verifying the accuracy of the reading, or one thereof can serve as a backup to provide an accurate reading when the other sensing device malfunctions. For example, when the optical sensing device fails to monitor the accurate amount of the consumed resource due to interference from an external flash source, the magnetic sensing device can still detect a reliable and accurate amount of the consumed resource. Conversely, when the magnetic sensing device detects an erroneous amount of the consumed resource in the presence of an external magnetic source, the optical sensing device is still able to provide a reliable and accurate amount of the consumed resource. The optical sensing device may be an LED optical sensor. The magnetic sensing device may be a magnetic sensor.

Figure 2:
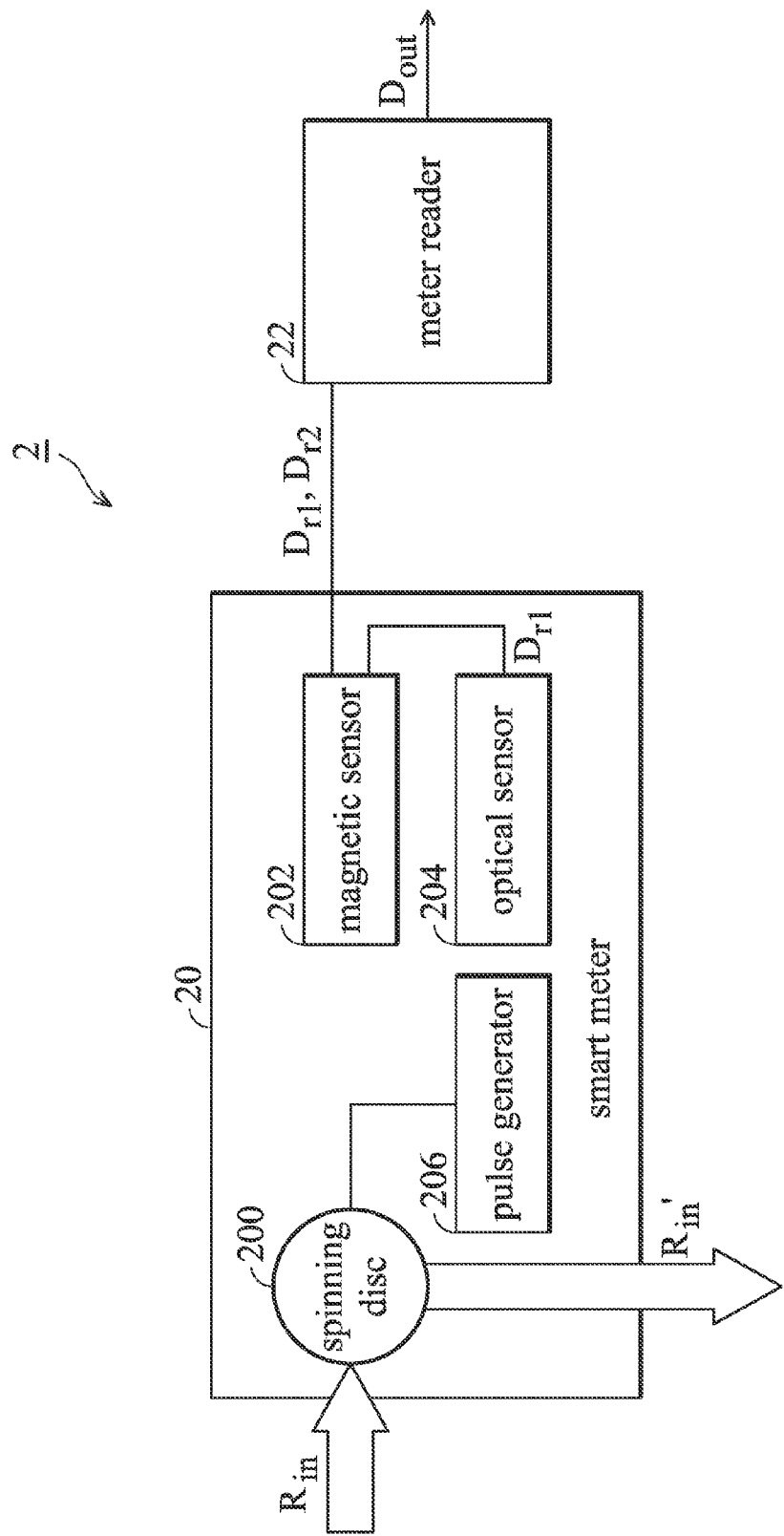
FIG. 2 is a block diagram of a smart meter 20 according to an embodiment of the invention.

FIG. 2 is a block diagram of a smart meter 20 according to an embodiment of the invention. The smart meter 20 may be a digital electricity meter, indicating the amount of the consumed energy, based on which meter reader reports the reading to the service network. The smart meter 20 may form a part of the smart grid 1. The smart meter 2 may be the electricity meter 100, the gas meter 102, or the water meter 104 in FIG. 1, with built-in sensors or external add-on sensors. The smart meter 20 comprises a spinning disc 2000, a magnetic sensor 202, an optical sensor 204, and a pulse generator 206. The meter reader 12 in FIG. 1 is identical to the meter reader 22 in the FIG. 2. The pulse generator 206 is coupled to the spinning disc 200, which is magnetically coupled to the magnetic sensor 202. Similarly, the pulse generator 206 is optically coupled to the optical sensor 204.

Taking the electricity meter 100 as an example, the electricity meter 100 detects instantaneous voltage and current, which are then multiplied together to derive a power. The spinning disc 200 in the electricity meter 100 then produces a certain amount of rotation (angle) proportional to the amount of the derived power. The spinning disc 200 rotates by an angle in proportion to the power, a wire is wound around the spinning disc 200 in such a way that it produces a magnetic flux proportional to the to the amount of the rotation, which may be detected by the magnetic sensor 202 to determine the amount of the rotation. The pulse generator 206 generates a number of pulses in proportion to the amount of the rotation. In some embodiments, the pulse generator 206 generates the number of the pulses based on the revolutions of the spinning disc 200. In other embodiments, the pulse generator 206 generates the number of the pulses based on the derived power directly. Using the magnetic sensor 202 and optical sensor 204, the smart meter 20 may detect the amount of the rotation and the number of the pulses independently and generate a first signal $D_{r1}$ and a second signal $D_{r2}$ respectively, where the first signal $D_{r1}$ indicates the number of the pulses and the second signal $D_{r2}$ indicates the amount of the rotation. Next, the magnetic sensor 202 and the optical sensor 204 separately transmit the first signal $D_{r1}$ and the second signal $D_{r2}$ to the meter reader 22 to determine the corresponding readings.

Referring back to FIG. 1, the meter reader 12 may receive sensed values from one or more users. The meter reader 12 receives a set of the first signal $D_{r1}$ and second signal $D_{r2}$ representing each type of the consumed resource for each user, and determines a common reading $D_{out}$ based on the received first signal $D_{r1}$ and the second signal $D_{r2}$. The meter reader 12 may be located in the reading system 10, in the service network 16, or in a resource distribution network between the reading system 10 and the service network 16. Although FIG. 1 illustrates the electricity meter 100, the gas meter 102, and the water meter 104 sharing a common meter reader 12 for determining the amount of each consumed resource, separate meter readers may be incorporated to separately produce readings for different types of the consumed resources.

Referring to FIG. 2, in some embodiments, the meter reader 22 determines whether the first signal $D_{r1}$ and the second signal $D_{r2}$ correspond to substantially a same amount of rotation. When it is so the meter reader 22 produces a common reading $D_{out}$ based on substantially the same amount of rotation. The meter reader 22 may also utilize reading determination methods 4 or 5 outlined in FIG. 4 or FIG. 5 to generate a common reading $D_{out}$. In the reading determination method 4, when one of the first signal $D_{r1}$ and the second signal $D_{r2}$ exhibits a speed that exceeds a predetermined speed limit, the meter reader 22 may determine that the signal with the exceeded speed is invalid, and produce the reading $D_{out}$ based on the valid one of the first and second signals $D_{r1}$, $D_{r2}$. In the reading determination method 5, when one of in the first signal $D_{r1}$ and the second signal $D_{r2}$ shows a irregular speed and the other one shows a regular speed, the meter reader 22 may produce the common reading $D_{out}$ only based on the signal with the regular speed.

In some implementations, the optical sensor 204 is coupled to the magnetic sensor 202 which transmits the first and the second signals $D_{r1}$, $D_{r2}$ to the meter reader 22 through a common transmission line. In other implementations, the optical sensor 204 and the magnetic sensor 202 may respectively transmit the first signal $D_{r1}$ and the second signal $D_{r2}$ to the meter reader 22 through dedicated transmission lines.

The smart grid 1 and the smart meter 20 employ two different sensing mechanisms detecting resource consumption at an end-user, verifying the two sensed results detected by the two sensing mechanisms, and generating an accurate reading for the consumed resource based on the two sensed results, to reduce risk of false reading.

Figure 3:
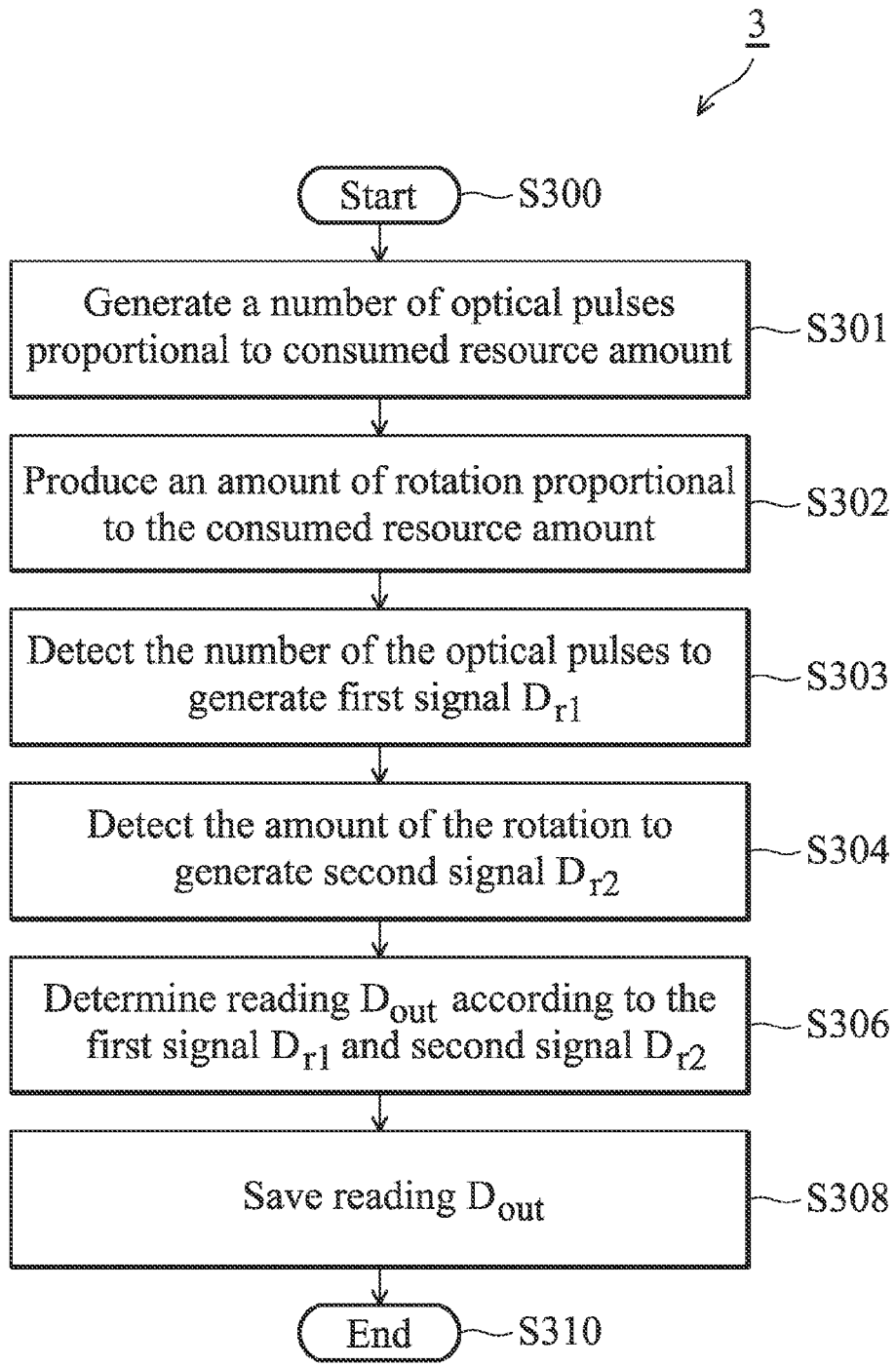
FIG. 3 is a flowchart of a metering method 3 according to an embodiment of the invention.

FIG. 3 is a flowchart of a metering method 3 according to an embodiment of the invention, incorporating the smart grid network 1 in FIG. 1 and the smart meter 20 in FIG. 2.

Figure 4:
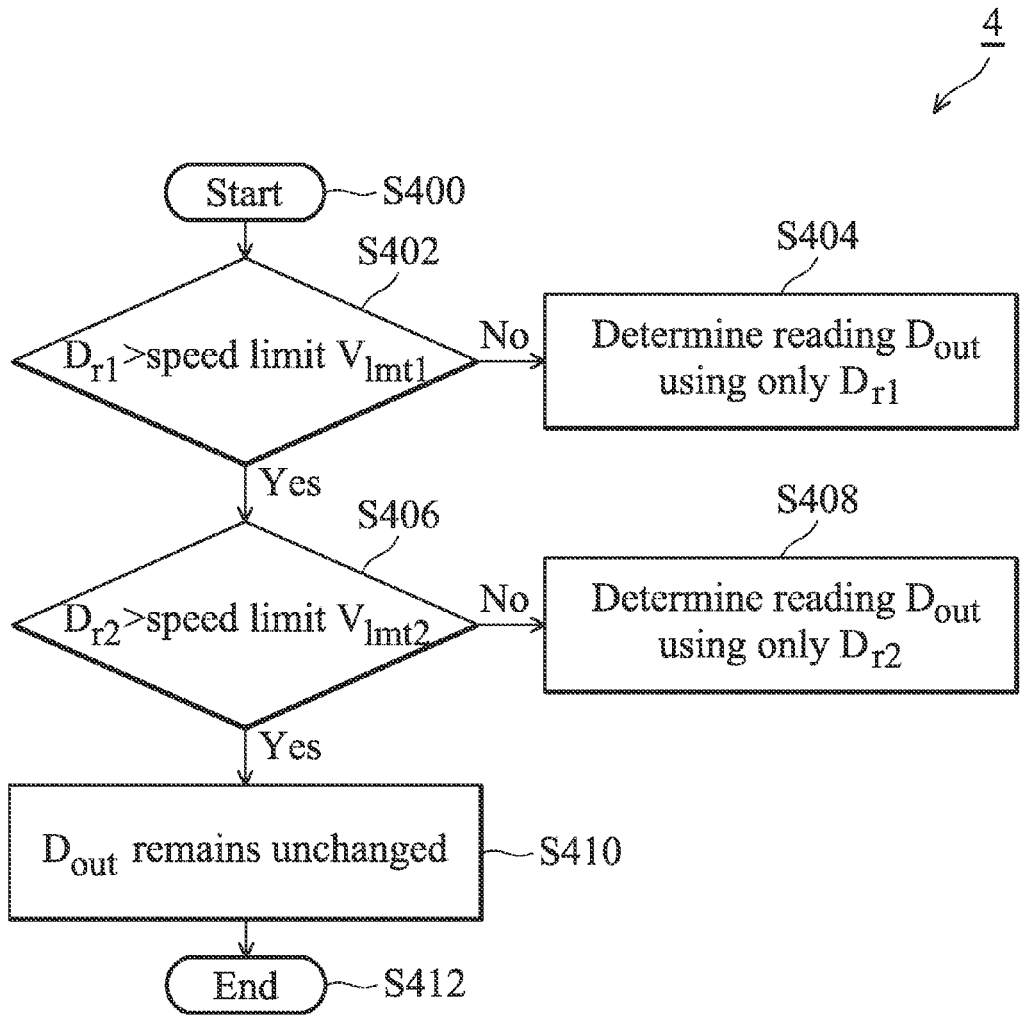
FIG. 4 is a flowchart of the reading determination method 4 according to an embodiment of the invention.
Figure 5:
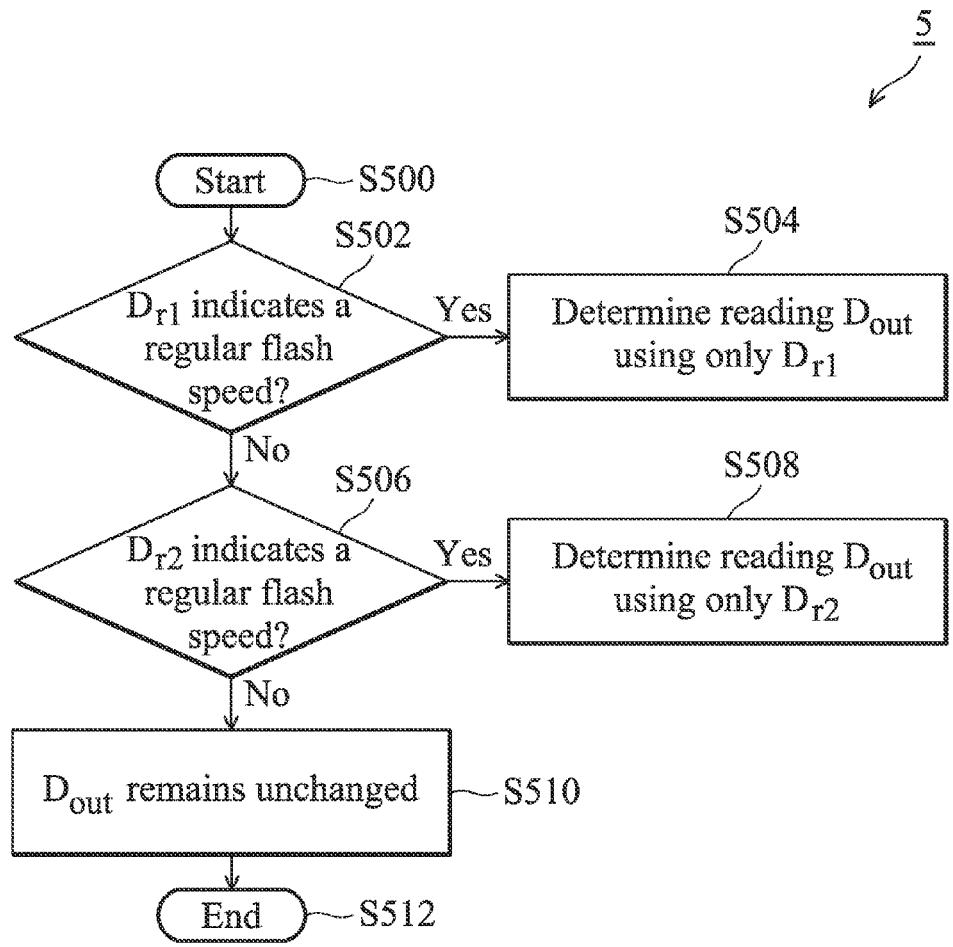
FIG. 5 is a flowchart of the reading determination method 5.

In Step S300, the smart meter 20 is initialized to gauge resource consumption for an end-user. The pulse generator 206 generates the number of pulses proportional to the consumed resource, for example, generating 600 pulses for every thousand-watt power (S301). The spinning disc 200 generates the amount of the rotation proportional to the consumed resource, for example, generating 1 turn for every thousand-watt power (S302). Accordingly, the optical sensor 204 detects the number of pulses to generate the first signal $D_{r1}$ (S303), and the magnetic sensor 202 detects the amount of the rotation to generate the second signal $D_{r2}$ (S304). The optical sensor and the magnetic sensor 202 transmit the first and second signals $D_{r1}$, $D_{r2}$ to the meter reader 22 through a common or separate transmission lines, which subsequently determine the common reading $D_{out}$ according to the first and second signal $D_{r1}$, $D_{r2}$ (S306). In some embodiments, the meter reader 22 determines whether the first and second signals $D_{r1}$, $D_{r2}$ represent the substantially same rotation angle, and produces the common reading using the substantially same rotation angle when it is so. FIGS. 4 and 5 show the reading determination methods 4 and 5 accommodating the process in the step S306. Lastly, the meter reader 22 transmits the common reading $D_{out}$ to the server 160 in the service network 160 for storage (308), thus the metering method 3 is completed and exited (S310).

FIG. 4 is a flowchart of the reading determination method 4 according to an embodiment of the invention, incorporated in the step 306 in FIG. 3. Upon startup of the reading determination method 4 (S400), the meter reader 22 determines whether the speed of the first signal $D_{r1}$ has exceeded a speed limit $V_{lmt1}$, where the first signal represents the number of the pulses (S402). The optical sensor 204 would not detect the first signal $D_{r1}$ with the speed exceeding the speed limit $V_{lmt1}$ under a normal condition. The exceeded speed of the first signal $D_{r1}$ suggests that an external flash source is present near the smart meter 20, causing the optical sensor 204 to pick up the light pulses from the external flash source and produce an inaccurate sensed value. As a consequence the meter reader 22 disregards the first signal $D_{r1}$ for determining the reading, and the reading determination method 4 goes to Step S406. When the first signal $D_{r1}$ is less than or equal to the speed limit $V_{lmt1}$, the meter reader 22 determines that the first signal $D_{r1}$ is normal, and determines the reading $D_{out}$ using only the first signal $D_{r1}$ (S404). In step S406, the meter reader 22 further determines whether the speed of the second signal $D_{r2}$ has exceeded a speed limit $V_{lmt2}$. The magnetic sensor 202 would not detect the second signal $D_{r2}$ with the speed exceeding the speed limit $V_{lim2}$ under a normal condition. The exceeded speed of the second signal $D_{r2}$ suggests that another external magnetic source is nearby, causing the magnetic sensor 202 to detect the magnetic flux from the external magnetic source and produce an inaccurate detected value. Thus the meter reader 22 disregards the second signal $D_{r2}$ for determining the reading, and the reading determination method 4 goes to Step S410. When the second signal $D_{r2}$ is less than or equal to the speed limit $V_{lmt2}$, the meter reader 22 determines that the second signal $D_{r2}$ is normal, and determines the reading $D_{out}$ using only the second signal $D_{r2}$ (S408). In Step S410, since the first signal $D_{r1}$ and second signal $D_{r2}$ both exceed the corresponding speed limits, both signals may be erroneous, thus the meter reader 22 would make the value of the reading $D_{out}$ to remain unchanged. Although the reading determination method 4 evaluates the number of pulses before evaluating the amount of the rotation, it could also adopt a reversed order of evaluation, i.e., determining whether the speed for the rotation then the speed of the pluses exceeding the corresponding speed limits. The speed limit $V_{lmt1}$ may be equal or unequal to the speed limit $V_{lmt2}$.

FIG. 5 is a flowchart of the reading determination method 5 according to an embodiment of the invention, incorporated in the step 306 in FIG. 3. Upon startup of the reading determination method 5 (S500), the meter reader 22 determines whether the speed of the first signal $D_{r1}$ is regular, where the first signal represents the number of the pulses (S502). The irregular pulses shown by the first signal $D_{r1}$ may suggest that an external flash source is in close presence to the smart meter 20, causing the optical sensor 204 to pick up the light pulses from the external flash source and produce an inaccurate detected value. As a consequence the meter reader 22 disregards the first signal $D_{r1}$ in determination of the reading, and the reading determination method 5 goes to Step S506. When the first signal $D_{r1}$ displays a regular pulse speed, the meter reader 22 determines that the first signal $D_{r1}$ is valid, and determines the reading $D_{out}$ using only the first signal $D_{r1}$ (S504). In step S506, the meter reader 22 further determines whether the second signal $D_{r2}$ indicates irregular rotation speed. The irregular rotation speed shown by the second signal $D_{r2}$ may suggest an external magnetic source is nearby, causing the magnetic sensor 202 to detect the magnetic flux from the unintended magnetic source and produce an inaccurate detected value. Thus the meter reader 22 disregards the second signal $D_{r2}$ in determination of the reading $D_{out}$, and the reading determination method 5 goes to Step S510. When the second signal $D_{r2}$ exhibits a regular rotation motion, the meter reader 22 determines the second signal $D_{r2}$ to be valid, and determines the reading $D_{out}$ using only the second signal $D_{r2}$ (S408). In Step S510, because the first signal $D_{r1}$ and second signal $D_{r2}$ both exhibit irregular speeds, both signals may be erroneous, thus the meter reader 22 makes the value of the reading $D_{out}$ to remain unchanged. Although the reading determination method 5 evaluates the optical pulses before the rotation motion, it could also adopt a reversed order, i.e., determining whether the rotation and then the pluses? show regular speeds. The pulse speed may be equal or unequal to the rotational speed.

The metering method 3 deploys the reading determination method 4 or 5 to utilize two different sensing mechanisms to produce sensed values, which are used for generating an accurate reading for a consumed resource, reducing the risk of generating false readings.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A meter apparatus, comprising:
   a pulse generator, configured to generate a number of pulses proportional to an amount of a consumed resource;
   an optical sensor, configured to detect the number of pulses to generate a first signal, and transmit the first signal to a meter reader;
   a spinning disc, configured to produce an amount of rotation proportional to the amount of the consumed resource;
   a magnetic sensor, configured to detect the amount of the rotation to generate a second signal, and transmit the second signal to the meter reader;

the meter reader, configured to determine that one of the first and second signals is valid when a speed of the one of the first and second signals is indicated to be less than or equal to a predetermined speed limit, and configured to generate a reading based only on the valid one of the first and second signals.

2. The meter apparatus of claim 1, further comprising the meter reader, configured to determine whether the first and second signals correspond to substantially a same amount of the consumed resource, and generate a reading according to substantially the same amount of the consumed resource when the first and second signals correspond to substantially a same amount of the consumed resource.

3. The meter apparatus of claim 1, further comprising the meter reader, configured to determine that one of the first and second signals is valid when a speed of the one of the first and second signals is indicated to be a regular speed, and configured to generate the reading based on the valid one of the first and second signals.

4. The meter apparatus of claim 1, wherein the optical sensor is coupled to the magnetic sensor, and the magnetic sensor is configured to transmit the first and second signals to the meter reader via a common transmission line.

5. A metering network, comprising:
an apparatus, comprising:
a pulse generator, configured to generate a number of pulses proportional to an amount of a consumed resource;
an optical sensor, configured to detect the number of pulses to generate a first signal, and transmit the first signal to a meter reader;
a spinning disc, configured to produce an amount of rotation proportional to the amount of the consumed resource; and
a magnetic sensor, configured to detect the amount of the rotation to generate a second signal, and transmit the second signal to the meter reader; and
the meter reader, configured to determine a reading according to the first and second signals, determine that one of the first and second signals is valid when a speed of the one of the first and second signals is indicated to be less than or equal to a predetermined speed limit, and generate the reading based only on the valid one of the first and second signals.

6. The metering network of claim 5, wherein the meter reader is configured to determine whether the first and second signals correspond to substantially a same amount of the consumed resource, and generate a reading according to substantially the same amount of the consumed resource when the first and second signals correspond to substantially a same amount of the consumed resource.

7. The metering network of claim 5, wherein the meter reader is configured to determine that one of the first and second signals is valid when a speed of the one of the first and second signals is indicated to be a regular speed, and generate the reading based on the valid one of the first and second signals.

8. The metering network of claim 5, wherein the optical sensor is coupled to the magnetic sensor, and the magnetic sensor is configured to transmit the first and second signals to the meter reader via a common transmission line.

9. The metering network of claim 5, further comprising a server, configured to store the reading from the meter reader.

10. A metering method, performed by a meter apparatus, comprising:
generating a number of pulses proportional to an amount of a consumed resource;
detecting the number of pulses to generate a first signal, and transmit the first signal to a meter reader;
producing an amount of rotation proportional to the amount of the consumed resource;
detecting the amount of the rotation to generate a second signal, and transmit the second signal to the meter reader;
determining that one of the first and second signals is valid when a speed of the one of the first and second signals is indicated to be less than or equal to a predetermined speed limit; and
generating a reading based only on the valid one of the first and second signals.

11. The metering method of claim 10, further comprising determining a reading according to the first and second signals.

12. The metering method of claim 10, further comprising:
determining whether the first and second signals correspond to substantially a same amount of the consumed resource; and
generating a reading according to substantially the same amount of the consumed resource when the first and second signals correspond to substantially a same amount of the consumed resource.

13. The metering method of claim 10, further comprising:
determining that one of the first and second signals is valid when a speed of the one of the first and second signals is indicated to be a regular speed; and
generating the reading based only on the valid one of the first and second signals.

14. The metering method of claim 10, further comprising:
coupling the optical sensor to the magnetic sensor; and
transmitting the first and second signals to the meter reader via a common transmission line.

15. A meter apparatus, comprising:
a pulse generator, configured to generate a number of pulses proportional to an amount of a consumed resource;
an optical sensor, configured to detect the number of pulses to generate a first signal, and transmit the first signal to a meter reader;
a spinning disc, configured to produce an amount of rotation proportional to the amount of the consumed resource;
a magnetic sensor, configured to detect the amount of the rotation to generate a second signal, and transmit the second signal to the meter reader;
the meter reader, configured to determine that one of the first and second signals is valid when a speed of the one of the first and second signals is indicated to be a regular speed, and configured to generate a reading based on the valid one of the first and second signals.

16. An apparatus, comprising:
a pulse generator, configured to generate a number of pulses proportional to an amount of a consumed resource;
an optical sensor, configured to detect the number of pulses to generate a first signal, and transmit the first signal to a meter reader;
a spinning disc, configured to produce an amount of rotation proportional to the amount of the consumed resource; and
a magnetic sensor, configured to detect the amount of the rotation to generate a second signal, and transmit the second signal to the meter reader; and
the meter reader, configured to determine a reading according to the first and second signals, determine that one of the first and second signals is valid when a speed of the one of the first and second signals is indicated to be a regular speed, and generate the reading based on the valid one of the first and second signals.

17. A metering method, performed by a meter apparatus, comprising:
   generating a number of pulses proportional to an amount of a consumed resource;
   detecting the number of pulses to generate a first signal, and transmit the first signal to a meter reader;
   producing an amount of rotation proportional to the amount of the consumed resource;
   detecting the amount of the rotation to generate a second signal, and transmit the second signal to the meter reader;
   determining that one of the first and second signals is valid when a speed of the one of the first and second signals is indicated to be a regular speed; and
   generating a reading based only on the valid one of the first and second signals.

\* \* \* \* \*